(12) United States Patent
Li

(10) Patent No.: US 12,485,720 B2
(45) Date of Patent: Dec. 2, 2025

(54) VEHICLE HEAT PUMP SYSTEM WITH COORDINATED ENERGY MANAGEMENT OF CABIN AND BATTERY

(71) Applicant: FCA US LLC, Auburn Hills, MI (US)

(72) Inventor: Meng Li, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 264 days.

(21) Appl. No.: 18/326,675

(22) Filed: May 31, 2023

(65) Prior Publication Data

US 2024/0399816 A1 Dec. 5, 2024

(51) Int. Cl.
*B60H 1/00* (2006.01)
*H01M 10/613* (2014.01)
*H01M 10/625* (2014.01)
*H01M 10/6569* (2014.01)
*H01M 10/663* (2014.01)

(52) U.S. Cl.
CPC ..... *B60H 1/00278* (2013.01); *B60H 1/00885* (2013.01); *B60H 1/00899* (2013.01); *H01M 10/613* (2015.04); *H01M 10/625* (2015.04); *H01M 10/6569* (2015.04); *H01M 10/663* (2015.04); *B60H 2001/00928* (2013.01); *B60H 2001/00949* (2013.01)

(58) Field of Classification Search
CPC ............ B60H 1/00278; B60H 1/00885; B60H 1/00899; B60H 2001/00928; B60H 2001/00949; B60H 1/00392; B60H 2001/00307
See application file for complete search history.

(56) References Cited

U.S. PATENT DOCUMENTS

| 7,147,071 | B2 | 12/2006 | Gering et al. |
| 8,209,073 | B2 | 6/2012 | Wijaya et al. |
| 2015/0027143 | A1 | 1/2015 | Nemesh |
| 2022/0355645 | A1* | 11/2022 | Jeong ................. B60H 1/00664 |

FOREIGN PATENT DOCUMENTS

| CN | 112689570 A | * | 4/2021 | ......... B60H 1/00278 |
| CN | 116176265 A | * | 5/2023 | |
| DE | 112018006981 T5 | * | 10/2020 | ......... B60H 1/00328 |

* cited by examiner

*Primary Examiner* — Kun Kai Ma
(74) *Attorney, Agent, or Firm* — Jeremy J. Klobucar

(57) ABSTRACT

A vehicle thermal management system includes a heat pump system, a coolant loop that transfers heat energy between a battery and a cabin heating, ventilation, and air-conditioning (HVAC) module. The heat pump system can be an air-source heat pump or coolant-based heat pump with a water condenser. The coolant loop includes a low-temperature cooling system that rejects coolant heat to the ambient environment through a radiator. The cabin HVAC module includes a blower, a vent door, a cabin heater, and an evaporator. The coolant loop of the thermal management system includes an electric water pump, a chiller, a cabin heat exchanger, a three-way valve, and a one-way valve. The vehicle thermal management system can take advantage of a temperature difference between cabin exhaust air and battery coolant for heating and cooling, which reduces system power consumption.

2 Claims, 8 Drawing Sheets

VEHICLE HEAT PUMP SYSTEM WITH COORDINATED ENERGY MANAGEMENT OF CABIN AND BATTERY

FIELD

The present application relates generally to thermal management in electrified vehicles and, more particularly, to thermal management systems for electrified vehicles which coordinate management of heat energy associated with a battery and cabin air.

BACKGROUND

Electric vehicles have shown competitive advantages compared with vehicles that use an internal combustion engine because of low energy cost and improved power performance. In an electric vehicle, a thermal management system usually consumes a significant amount of energy at extreme ambient temperature conditions, and its efficiency can have a notable impact on a range of the vehicle. For low-temperature cabin heating, positive temperature coefficient heaters are conventionally adopted and operate by directly converting electric power into heating power, and hence indicate a heating efficiency smaller than 100%. Although a heat pump system can improve the heating efficiency, it has limited heating performance and frosting problems after continuous operation.

In the prior art thermal management systems, heat energy from cabin air and the battery are not well coordinated or utilized, and hence the system efficiency is compromised. If the cabin air can be used to cool the battery or recovered through the heat pump system, it will provide better system energy utilization and efficiency. Therefore, it is desirable to develop an efficient vehicle thermal management system with coordinated energy management of the cabin and the battery, so that various thermal management requirements can be met with low energy consumption and high efficiency.

SUMMARY

To achieve the above objective and other benefits and improvement, the present disclosure presents a thermal management system for electric vehicles, which includes a heat pump system and a coolant loop that transfers heat energy between the battery and the cabin heating, ventilation, and air-conditioning module. The heat pump system can be an air-source heat pump or coolant-based heat pump with a water condenser. The coolant loop includes a low-temperature cooling system that rejects the coolant heat to the ambient environment, an electric water pump, a chiller, a cabin heat exchanger, a three-way valve, and a one-way valve. The cabin heating, ventilation, and air-conditioning module includes a blower controlling airflow rate, a vent door, a cabin heater heating the cabin through the heat pump system, and an evaporator cooling the cabin through the heat pump system.

The improved thermal management system of the present disclosure provides important benefits as compared to the prior systems. Based on the refrigerant operation cycle, the heat pump system can provide cabin heating through the cabin heater, cabin cooling through the evaporator, and battery cooling and heat recovery through the chiller. The low-temperature cooling system can effectively cool the battery by rejecting the heat to the ambient environment through a radiator. With the coolant loop design, the thermal management system can either use the cabin air to cool the battery or to achieve heat recovery. Energy consumption can be reduced through flexible operating mode switching.

According to an aspect, the present disclosure indicates appropriate assembly of a thermal management system that fits an electrified vehicle with a battery pack. The heat pump system and the low-temperature cooling system are placed at the front of the vehicle. The cabin heat exchanger is located at the rear of the vehicle to exhaust cabin air to the ambient environment through the vent door. The cabin heater and the evaporator are connected with the heat pump system through the refrigerant loop and assembled into the cabin airflow loop along with the blower. Other components, including the battery, the chiller, the electric water pump, the three-way valve, and the one-way valve are connected with the coolant loop.

According to an aspect, the control module realizes communication connection with the following components or subsystems, including: the heat pump system, the low-temperature cooling system, the blower, the electric water pump, the three-way valve, the one-way valve, and the vent door. The control module controls the heat pump system to activate cabin heating through the cabin heater and cabin cooling through the evaporator. The control module controls the heat pump system to activate battery cooling through the chiller. The control module controls the low-temperature system and the electric water pump to extract the heat from the battery coolant. The control module controls the blower and the vent door to manage the airflow inside the cabin. The control module controls the three-way valve and the one-way valve to switch the operating mode based on the requirements of the thermal management system.

According to an aspect, the thermal management system can use the ambient environment to cool the battery through the low-temperature cooling system. According to an aspect, the thermal management system can use the cabin air to cool the battery through the cabin heat exchanger. According to an aspect, the thermal management system can use the chiller to cool the battery through the heat pump system. According to an aspect, the thermal management system can absorb the waste heat from the battery and the cabin air through the heat pump system.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DETAILED DESCRIPTION

Figure 1:
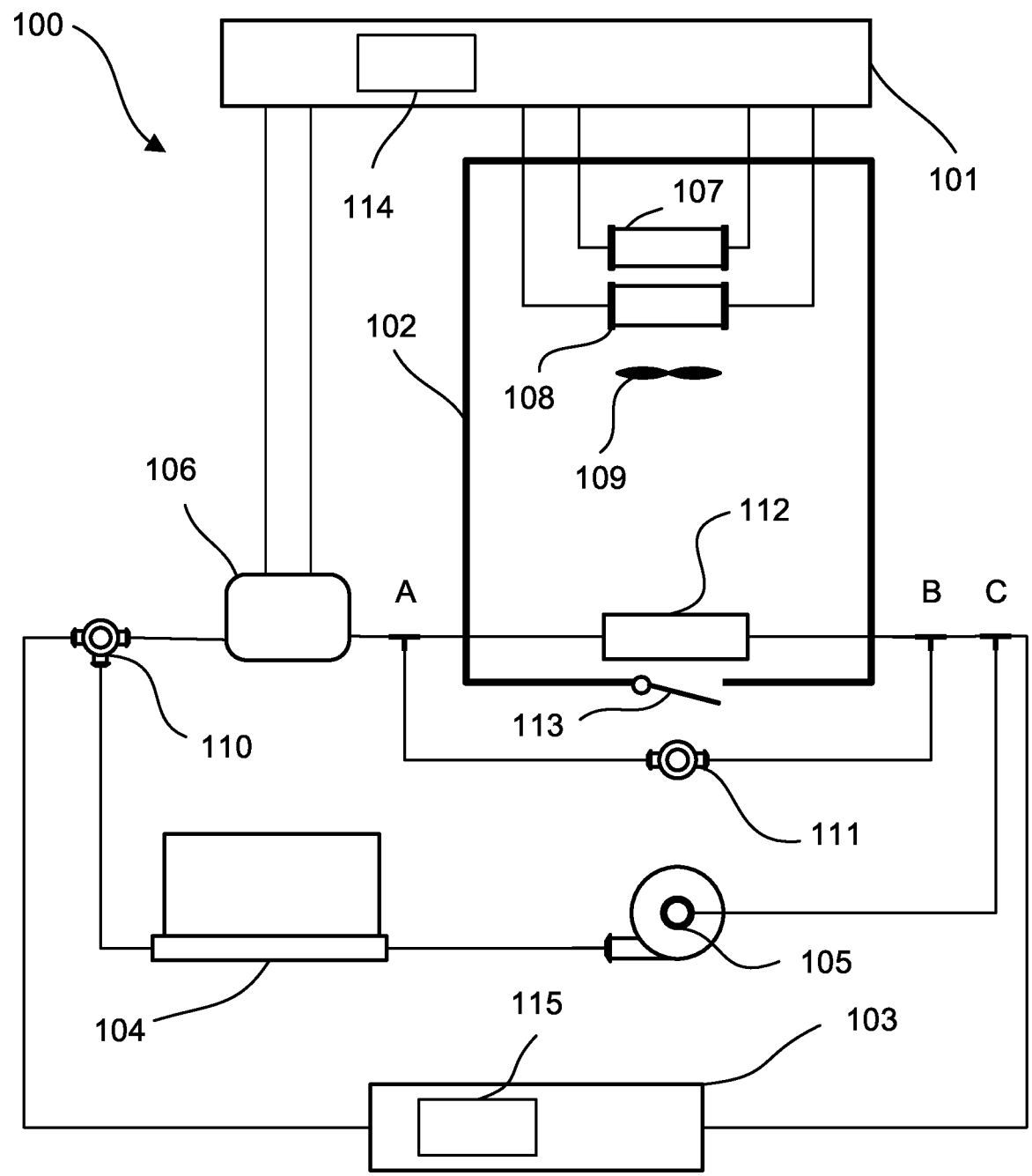
FIG. 1 is a high level system diagram of a vehicle thermal management system according to an embodiment of the present application.

FIG. 1 is an example system schematic of a vehicle thermal management system 100 illustrating various components and associated connections. In the example illustrated, the vehicle thermal management system 100 includes the heat pump system 101, the cabin heating, ventilation, and air-conditioning (HVAC) module 102, the low-temperature cooling system 103, the battery 104, the electric water pump 105, the chiller 106, the cabin heater 107, the evaporator 108, the blower 109, the three-way valve 110, the one-way valve 111, the cabin heat exchanger 112, and the vent door 113.

The heat pump system 101 can be an air-source heat pump or coolant-based heat pump with a water condenser, as is generally known in the art. Briefly, however, the heat pump system 101 can be a refrigerant flow system. At cold temperatures, it warms up the cabin by absorbing heat from the ambient environment or waste heat of other components that are cooled by coolant. At cold temperatures, it cools down the cabin using an evaporator. The heat pump system 101 can include a compressor 114 compressing the refrigerant into superheated steam to flow in the refrigerant circulation system, an outside heat exchanger that absorbs the heat from the ambient, expansion valves that control the degree of superheat, and valves that control the refrigerant flow connections. The heat pump system 101 provides circuit ports of connection for the chiller 106, the cabin heater 107, and the evaporator 108 in the vehicle thermal management system 100.

The cabin heating, ventilation, and air-conditioning (HVAC) module 102 provides appropriate temperature and airflow through control of the blower 109, the cabin heater 107, and the evaporator 108. Both the cabin heater 107 and the evaporator 108 are connected with the heat pump system 101 through the refrigerant loop to generate heating and cooling power. The cabin airflow is determined by operation of the blower 109 and the vent door 113.

The low-temperature cooling system 103 rejects the coolant heat to the ambient environment through a radiator 115. The low-temperature cooling system 103 includes electric water pump(s) 105 that generate the hydraulic power for pumping coolant through the radiator 115, which provides heat exchange between the air and the coolant, and a valve that controls the coolant flow connections, as is generally known in the art. The low-temperature cooling system 103 also provides circuit ports of connection for three-way valve 110 and junction C in the vehicle thermal management system 100.

The battery 104 is connected in the coolant loop with the electric water pump 105 and the three-way valve 110. The one-way valve 111 is in parallel with the cabin heat exchanger 112, where the coolant flow is bypassed when heat exchange is not desirable for the cabin heat exchanger 112. The junction A provides connections among the chiller 106, the cabin heat exchanger 112, and the one-way valve 111. The junctions B and C connect the cabin heat exchanger 112, the one-way valve 111, and the electric water pump 105. With opening and close control of the three-way valve 110 and the one-way valve 111, heat energy can be transferred from the cabin air to other subsystems, such as the heat pump system 100 and the battery 104.

Figure 2:
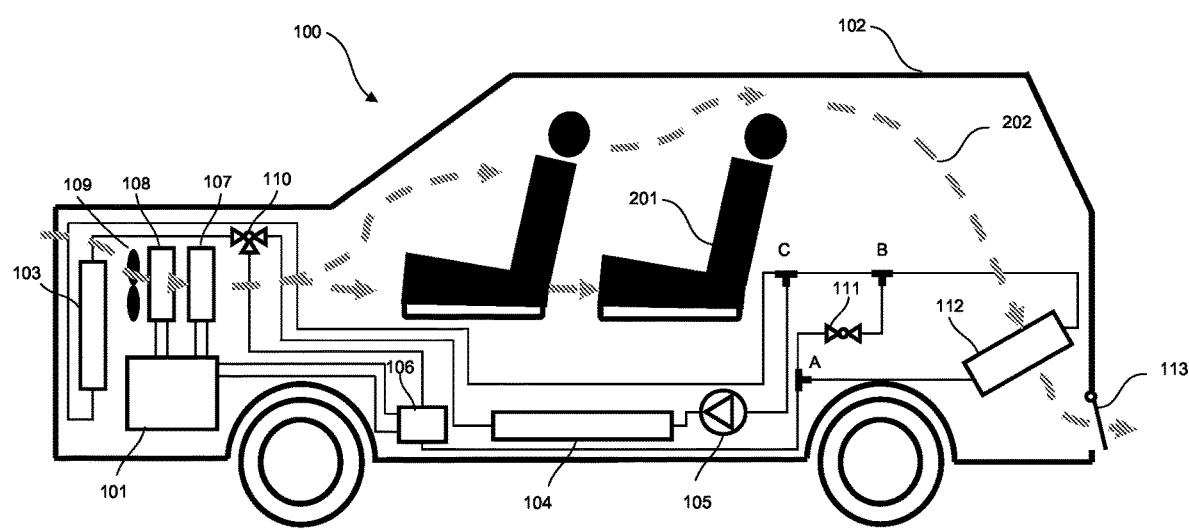
FIG. 2 is a schematic diagram showing an example layout of the thermal management system in a vehicle according to an embodiment of the present application.

FIG. 2 demonstrates an example packaging of the thermal management system 100 in an electrified vehicle. The heat pump system 101 and the low-temperature cooling system 103 are placed at the front of the vehicle. Inside the cabin heating, ventilation, and air-conditioning (HVAC) module 102, the cabin heater 107, the evaporator 108, and the blower 109 are in series in an airflow loop. The cabin heat exchanger 112 is located at the rear of the vehicle to exhaust cabin air to the ambient environment through the controllable vent door 113, as shown by the airflow direction 202. The battery 104 is located at the bottom of the cabin seats 201. The coolant and refrigerant plumbing fit the layout of the vehicle subsystems and components.

Figure 3:
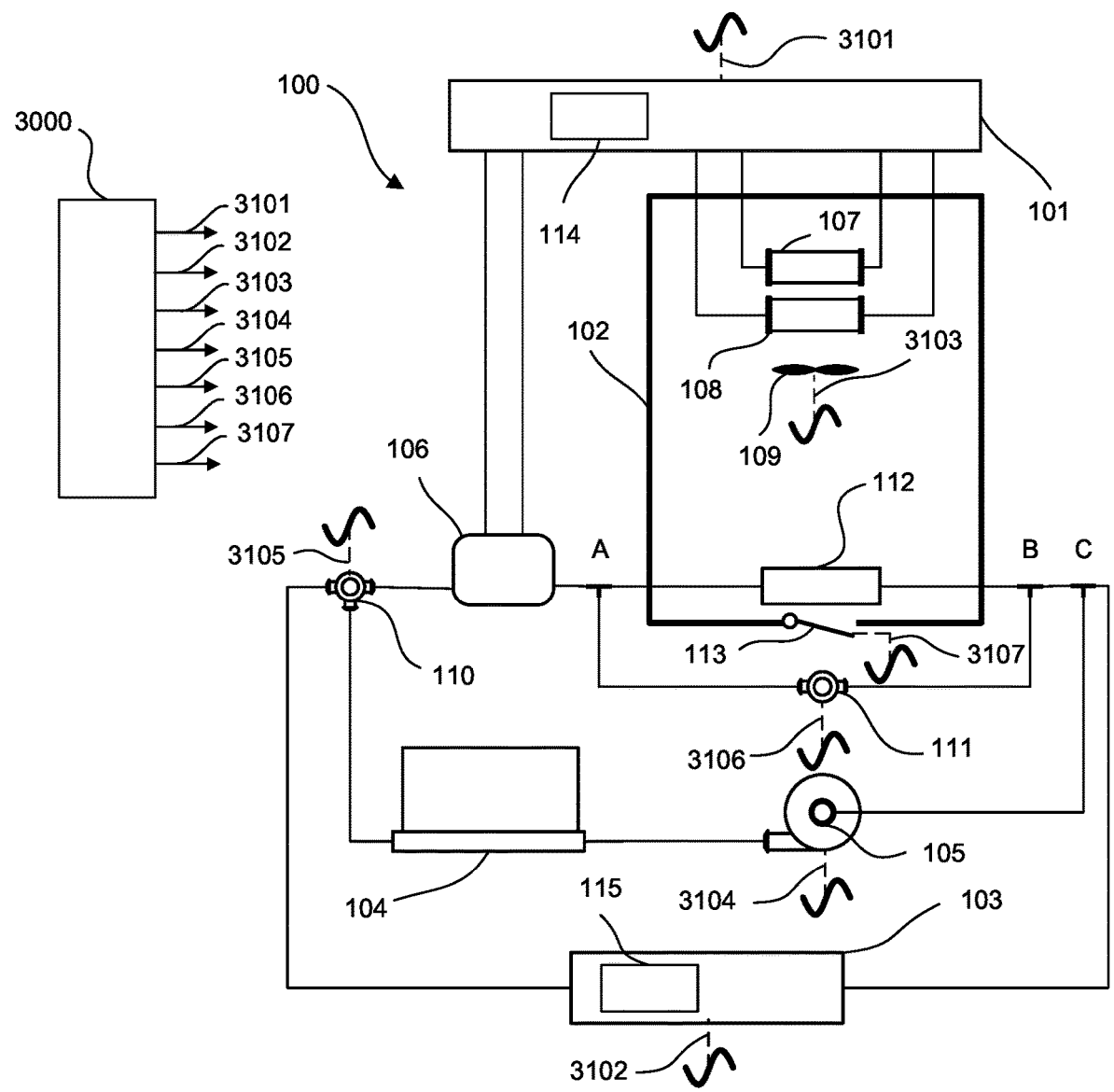
FIG. 3 is a high level schematic diagram showing the control signal communication in the vehicle thermal management system according to an embodiment of the present application.

FIG. 3 shows example signal communication between the control module 3000 and each actuator of the vehicle thermal management system 100. The control module 3000 output signals, 3101, 3102, 3103, 3104, 3105, 3106, and 3107, which are respectively connected to the heat pump system 100, the low-temperature cooling system 103, the blower 109, the electric water pump 105, the three-way valve 110, the one-way valve 111, and the vent door 113.

The control module controls the heat pump system to activate cabin heating through the cabin heater and cabin cooling through the evaporator. The control module controls the heat pump system to activate battery cooling through the chiller. The control module controls the low-temperature system and the electric water pump to extract the heat from the battery coolant. The control module controls the blower and the vent door to manage the airflow inside the cabin. The control module controls the three-way valve and the one-way valve to switch/configure operating mode based on the requirements of the thermal management system.

Figure 4:
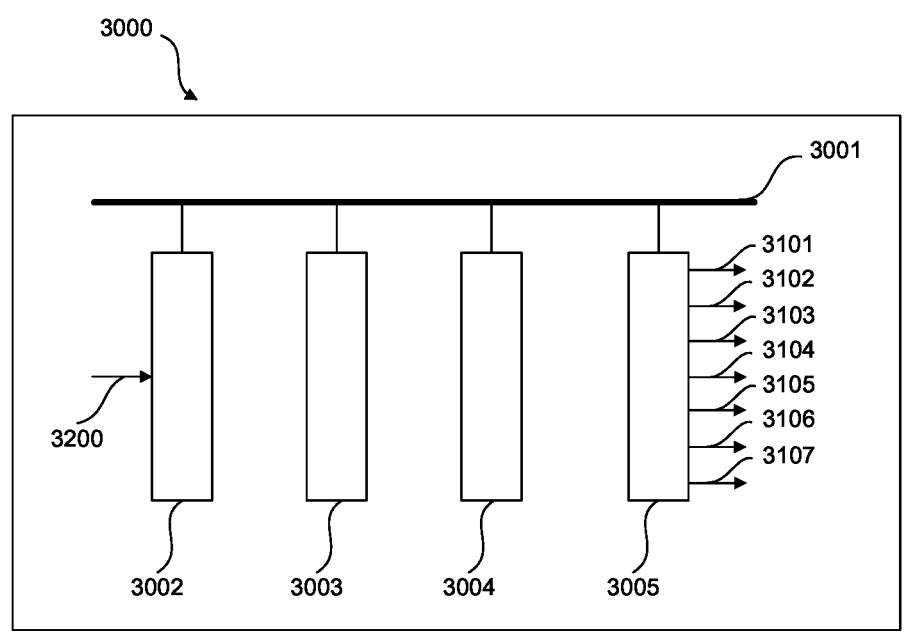
FIG. 4 is an example internal structure diagram of the control module shown in FIG. 2 according to an embodiment of the present application.

FIG. 4 illustrates an example internal structure of the control module 3000 shown in FIG. 2. The control module 3000 of the vehicle thermal management system 100 includes the can bus 3001, the input interface 3002, the memory 3003, the processor 3004 and the output interface 3005. Specifically, the input interface 3002 receives the operation request and other operation parameters; the memory 3003 is used to store instructions and data; the processing 3004 reads instructions and data from the memory 3003 and can write data to the memory 3003; the output interface 3005 sends the control signals to each actuator.

FIG. 5-8 are system diagrams of the vehicle thermal management system 100 shown in FIG. 1 to illustrate the fluid flow states of the vehicle thermal management system 100 in different operating modes. The hollow line arrows indicate active coolant flow, and dashed line arrow indicates active refrigerant flow, and other lines indicate no fluid flow. Each working mode will be described in detail as below.

Figure 5:
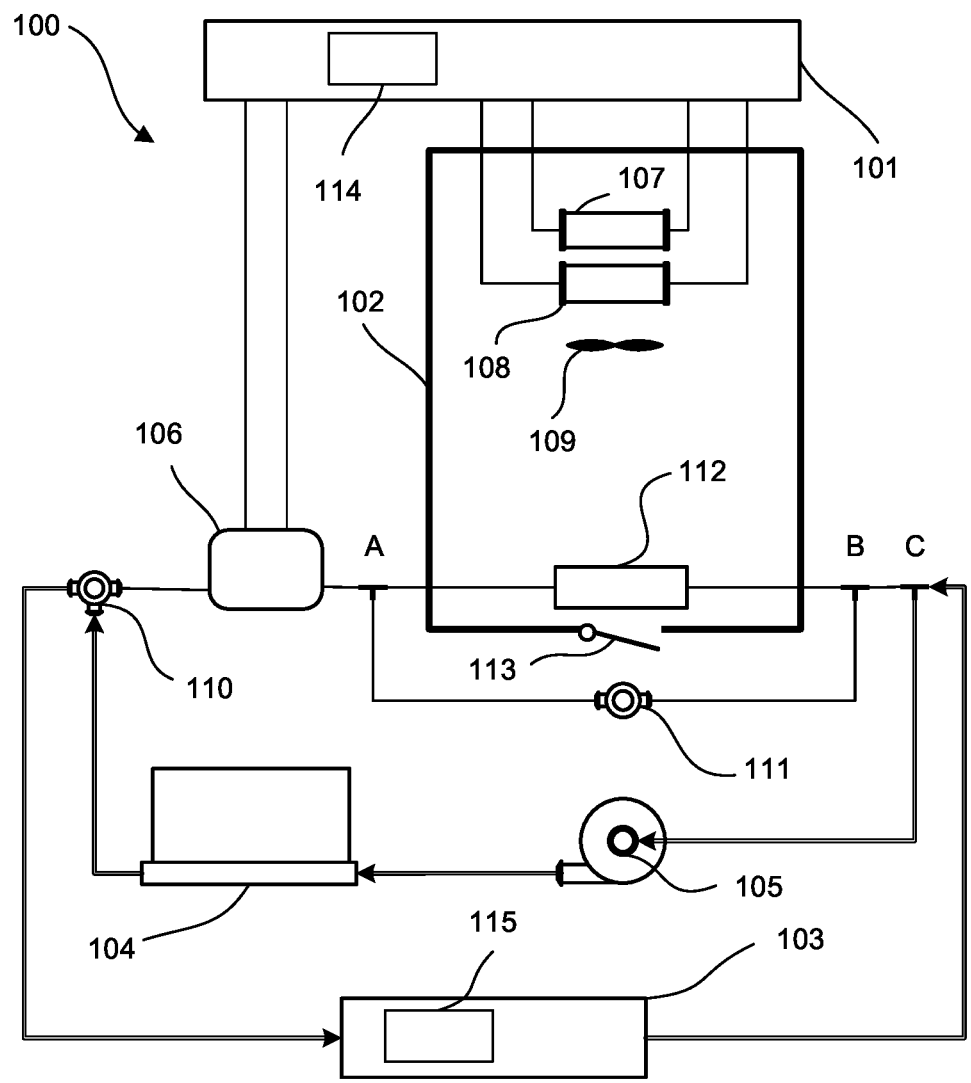
FIG. 5 is an example operation diagram of the vehicle thermal management system shown in FIG. 1 where the battery is cooled by the ambient environment through the low-temperature cooling system according to an embodiment of the present application.

FIG. 5 is an example system diagram of a battery cooling mode with the battery 104 cooled by the low-temperature cooling system 103. When the environment temperature is low or moderate, the low-temperature cooling system 103 can reject the coolant heat to the ambient through radiator 115. The electric pump 105 pumps coolant to flow through the cooling channels inside the battery 104 to extract the battery heat. With the command signals by the control module 3000, the three-way valve 110 connects the outlet of the battery 104 and the low-temperature cooling system 103. The one-way valve 111 is commanded closed. The cooled coolant at the outlet of the low-temperature cooling system 103 returns to the electric pump 105 with pump suction. This mode can utilize the temperature difference between the ambient and the coolant to efficiently cool the battery.

Figure 6:
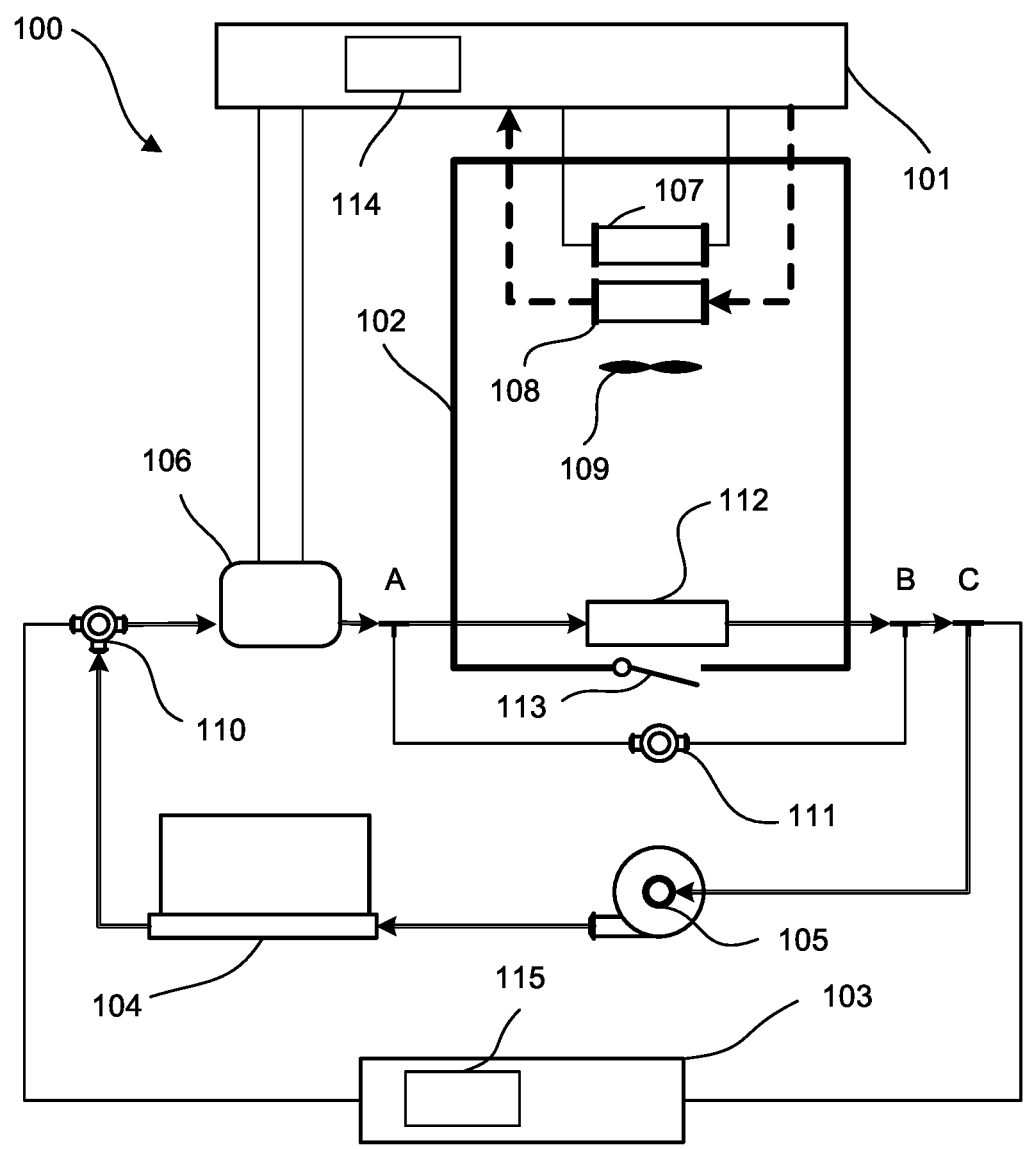
FIG. 6 is an example operation diagram of the vehicle thermal management system shown in FIG. 1 where the battery is cooled by the cabin air through the cabin heat exchanger according to an embodiment of the present application.

FIG. 6 is a system diagram of the battery cooling mode with the battery 104 cooled by the cabin heat exchanger 112. When cabin cooling is commanded by the control module 3000, the evaporator can cool the cabin air with refrigerant phase change through an expansion device in the heat pump system 101. The three-way valve 110 connects the outlet of the battery 104 and the chiller 106. The one-way valve 111 is closed. With low temperature of cabin exhaust air, the cabin heat exchanger 112 can extract the heat from the coolant by the airflow passing through the vent door 113. The electric pump 105 pumps coolant to flow through the battery 104, the chiller 106, and the cabin heat exchanger 112. This mode can utilize the temperature difference between the cabin exhaust air and the coolant to efficiently cool the battery 104, without affecting the cabin thermal comfort.

Figure 7:
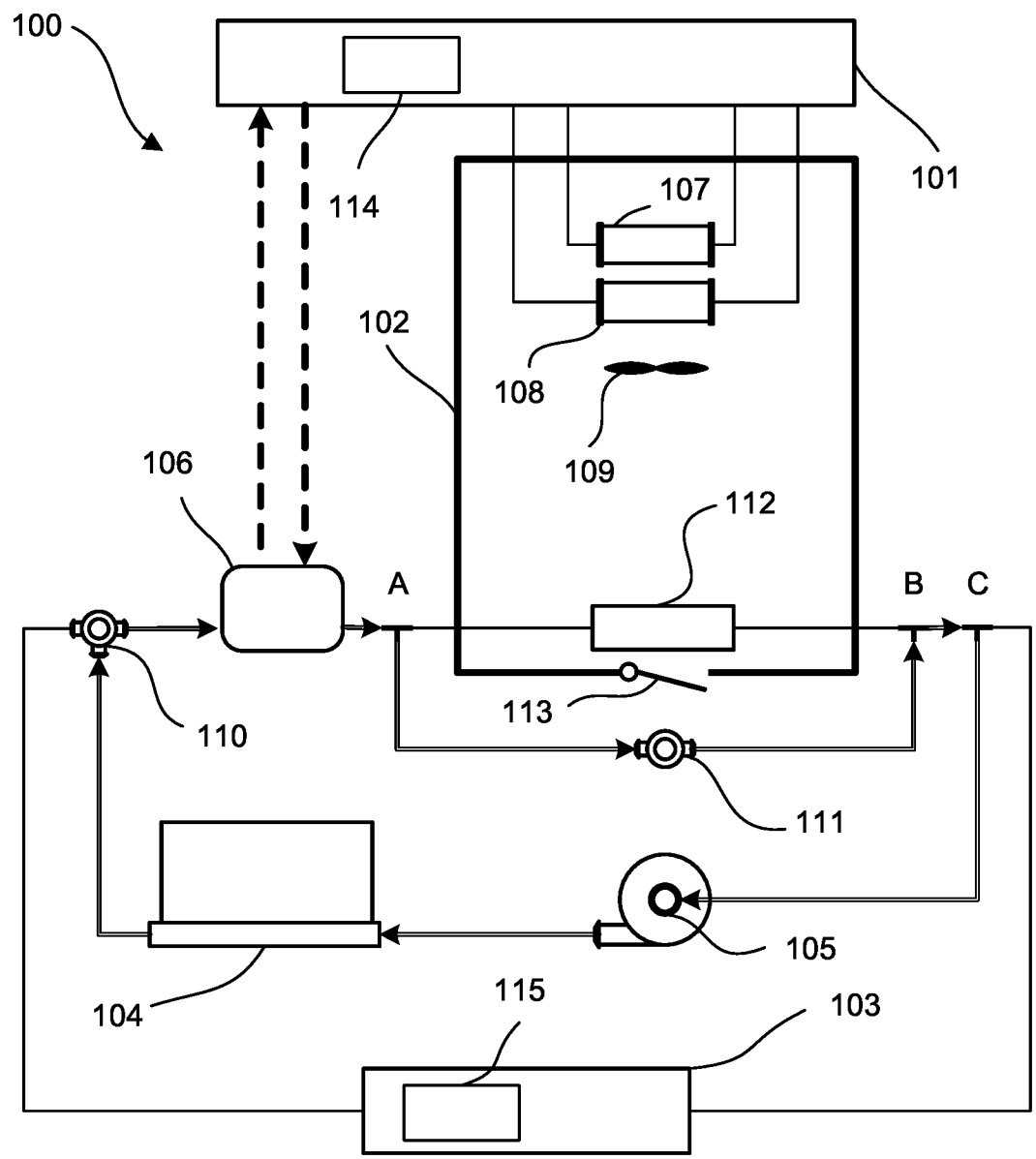
FIG. 7 is an example operation diagram of the vehicle thermal management system shown in FIG. 1 where the battery is cooled by the chiller through the heat pump system according to an embodiment of the present application.

FIG. 7 is an example system diagram of the battery cooling mode where the battery 104 is cooled using the chiller 106. The three-way valve 110 connects the outlet of the battery 104 and the chiller 106. When the ambient and cabin temperature are high, the battery 104 can hardly be cooled by the low-temperature cooling system 103 or the cabin heat exchanger 112. Instead, the chiller 106 can provide high cooling power with refrigerant phase change through an expansion device in the heat pump system 101. The electric pump 105 pumps coolant to flow through the battery 104, the chiller 106, and the one-way valve 111. The coolant flows through the one-way valve 111, because when it is open, the pressure drop of the branch containing this valve is much smaller than the branch with the cabin heat exchanger 112. This mode can utilize the refrigerant flow of the heat pump system 101 to effectively cool the battery 104.

Figure 8:
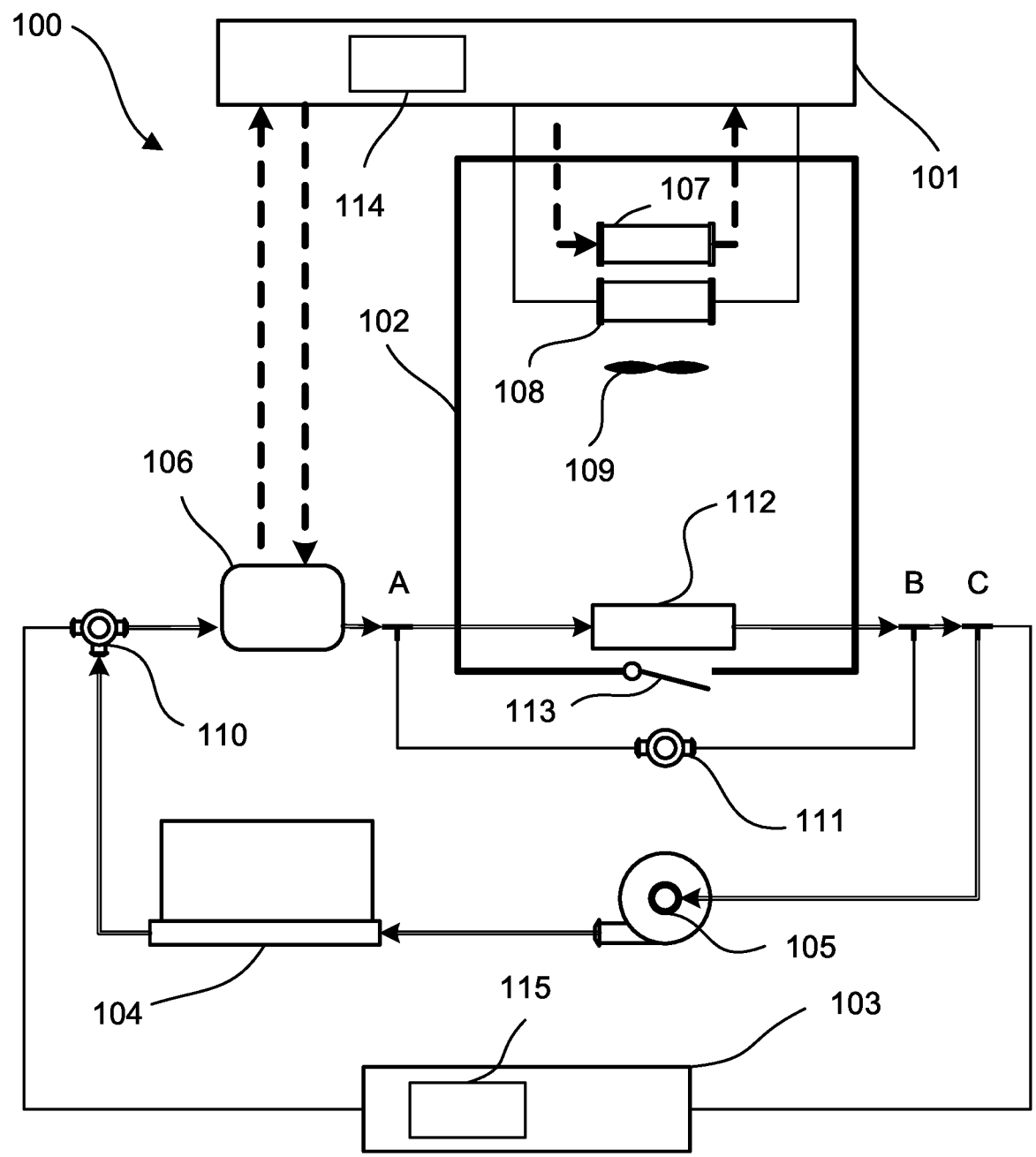
FIG. 8 is an example operation diagram of the vehicle thermal management system shown in FIG. 1 where the waste heat from the battery and the cabin air is recovered through the heat pump system according to an embodiment of the present application.

FIG. 8 is a system diagram of the heat recovery mode where the waste heat of the battery 104 and the cabin air are absorbed by the chiller 106 that is connected with the heat pump system 101. When the coolant temperature or cabin exhaust air temperature is high, the heat energy can be absorbed by the chiller 106 connected with the heat pump system 101, which can heat the cabin with the cabin heater 107. This mode transfers the energy from the battery 104 and cabin exhaust air to efficiently heat the cabin.

As used herein, the terms "comprise", "comprising", "includes", "including", "has", "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A thermal management system for an electrified vehicle having an interior cabin, the vehicle thermal management comprising:
 a heat pump system including a compressor for circulating refrigerant through the heat pump system;

a coolant loop for the flow of coolant includes a low temperature cooling system configured to reject coolant heat to the ambient environment, a cabin heat exchanger, a chiller, a three-way valve, an electric water pump and a one-way valve configured to be in coolant fluid communication with each other and a battery during one or more operating modes of the thermal management system, wherein the chiller includes a circuit in refrigerant communication with the heat pump system; and a cabin heating, ventilation and air-conditioning (HVAC) system including an evaporator, a cabin heater, a blower controlling airflow rate and a vent door, wherein the evaporator and the cabin heater are in refrigerant fluid communication with the heat pump system; and a control system in signal communication with the one-way valve, the three-way valve, the water pump, the heat pump system, the blower and the low temperature cooling system;

wherein the control system:
  is configured to control the heat pump system and the water pump and the three-way and one-way valves of the coolant loop in a waste heat recovery mode to recover waste heat from the battery and from cabin exhaust air using the heat pump system to provide heated air to the cabin including:
    controlling the three-way valve and the one-way valve to place the battery, water pump, chiller and cabin heat exchanger in coolant fluid communication with each other while bypassing the low temperature cooling system;
    controlling the water pump to pump coolant through the battery to absorb waste heat from the battery resulting in heated coolant that flows through the chiller; and
    controlling the heat pump system to circulate refrigerant through the chiller to extract heat from the heated coolant resulting in heated refrigerant, which is passed through the cabin heater to provide heated air to the cabin in connection with the blower of the HVAC system.

2. The thermal management system of claim 1, wherein the control system:
  controls a vent door of the HVAC system to open to allow the heated air provided to the cabin via the blower to exit the cabin as heated exhaust air by passing through the cabin heat exchanger and vent door,
  wherein coolant flowing through the cabin heat exchanger absorbs additional waste heat from the heated exhaust air passing through the cabin heater exchanger thereby providing additional waste heat energy to the heated coolant, which flows through the chiller, which results in additional heat energy in the heated refrigerant for use in heating the cabin.

* * * * *